(12) United States Patent
Lin (10) Patent No.: US 12,482,816 B2
(45) Date of Patent: Nov. 25, 2025

(54) ELECTROCHEMICAL APPARATUS AND ELECTRONIC APPARATUS INCLUDING SAME

(71) Applicant: Dongguan Amperex Technology Limited, Dongguan (CN)

(72) Inventor: Shengzeng Lin, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 457 days.

(21) Appl. No.: 18/090,667

(22) Filed: Dec. 29, 2022

(65) Prior Publication Data

US 2023/0216034 A1 Jul. 6, 2023

(30) Foreign Application Priority Data

Dec. 31, 2021 (CN) .......................... 202111667847.1

(51) Int. Cl.
*H01M 4/36* (2006.01)
*H01M 4/60* (2006.01)
(Continued)

(52) U.S. Cl.
CPC ........... *H01M 4/366* (2013.01); *H01M 4/602* (2013.01); *H01M 4/622* (2013.01); *H01M 2004/027* (2013.01); *H01M 2004/028* (2013.01)

(58) Field of Classification Search
CPC ...... H01M 4/366; H01M 4/602; H01M 4/622; H01M 2004/027; H01M 2004/028;
(Continued)

(56) References Cited

U.S. PATENT DOCUMENTS

2017/0338460 A1\* 11/2017 Kim .................... H01M 50/446
2017/0346063 A1\* 11/2017 Wong .................. H01M 50/491
(Continued)

FOREIGN PATENT DOCUMENTS

CN 107275552 A 10/2017
CN 110729440 A 1/2020
(Continued)

OTHER PUBLICATIONS

"Liu et al., CN 113498558 A—Machine Translated, Oct. 12, 2021" (Year: 2021).\*
(Continued)

*Primary Examiner* — Milton I Cano
*Assistant Examiner* — Jesse J Efymow
(74) *Attorney, Agent, or Firm* — XSENSUS LLP (57) ABSTRACT

An electrochemical apparatus formed by stacking and then winding a first separator, a negative electrode plate, a second separator, and a positive electrode plate. The negative electrode plate includes a negative electrode current collector, a first active material layer and a second active material layer. In a winding direction, a length of the first active material layer is greater than a length of the second active material layer. The first separator comprises a first substrate layer, a first coating layer and a second coating layer. The second separator comprises a second substrate layer, a third coating layer and a fourth coating layer. A bonding force between a first active material layer and second coating layer is less than a bonding force between a second active material layer and a fourth coating layer.

20 Claims, 3 Drawing Sheets

(51) Int. Cl.
*H01M 4/62* (2006.01)
*H01M 4/02* (2006.01)

(58) Field of Classification Search
CPC ......... H01M 10/0431; H01M 10/0525; H01M 10/052; H01M 10/0587; H01M 50/46; H01M 50/461; Y02E 60/10; Y02P 70/50
See application file for complete search history.

(56) References Cited

U.S. PATENT DOCUMENTS

| | | | |
|---|---|---|---|
| 2019/0273236 A1* | 9/2019 | Kikuchi | H01M 50/423 |
| 2020/0144673 A1* | 5/2020 | Tao | H01M 4/1391 |
| 2020/0411896 A1* | 12/2020 | Hong | H01M 10/0431 |
| 2021/0057700 A1* | 2/2021 | Huang | H01M 50/423 |
| 2022/0320595 A1* | 10/2022 | Zhao | H01M 50/124 |
| 2024/0097201 A1* | 3/2024 | Kawamura | H01M 4/13 |

FOREIGN PATENT DOCUMENTS

| | | | | |
|---|---|---|---|---|
| CN | 113498558 A | * | 10/2021 | ............ H01M 4/622 |
| CN | 113839084 A | * | 12/2021 | ........ H01M 10/0587 |
| JP | 2004095538 A | * | 3/2004 | |

OTHER PUBLICATIONS

"Wang et al., CN 113839084 A—Machine Translated, Dec. 24, 2021" (Year: 2021).*

"Osaki et al., : JP 2004-95538 A—Machine Translated, Mar. 25, 2004" (Year: 2004).*

* cited by examiner

ELECTROCHEMICAL APPARATUS AND ELECTRONIC APPARATUS INCLUDING SAME

CROSS-REFERENCE TO RELATED APPLICATION

The present application claims benefit of priority from the Chinese Patent Application Serial Number 202111667847.1, filed on Dec. 31, 2021, the content of which is incorporated by reference in its entirety.

TECHNICAL FIELD

This application relates to the electrochemical field, and specifically, to an electrochemical apparatus and an electronic apparatus including such electrochemical apparatus.

BACKGROUND

As a new type of removable energy storage apparatus, secondary batteries (for example, lithium-ion secondary batteries) have advantages such as high energy storage density, high open-circuit voltage, low self-discharge rate, long cycle life, and high safety, and therefore are widely used in various fields such as electric energy storage, mobile electronic devices, electric vehicles, and aerospace equipment.

Separator is an important component affecting performance of lithium-ion batteries. However, it is difficult for existing separators to balance cycling performance and safety performance of lithium-ion batteries.

SUMMARY

This application provides an electrochemical apparatus and an electronic apparatus including such electrochemical apparatus to alleviate lithium precipitation at corners of the electrochemical apparatus, thereby enhancing safety performance and cycling performance of the electrochemical apparatus.

It should be noted that a lithium-ion battery is used as an example of an electrochemical apparatus to explain this application. However, the electrochemical apparatus of this application is not limited to the lithium-ion battery.

A first aspect of this application provides an electrochemical apparatus formed by stacking and then winding a first separator, a negative electrode plate, a second separator, and a positive electrode plate. The negative electrode plate includes a negative electrode current collector, a first active material layer and a second active material layer; the first active material layer and the second active material layer are respectively provided on two opposite surfaces of the negative electrode current collector, and in a winding direction of the electrochemical apparatus, a length of the first active material layer is greater than a length of the second active material layer. The first separator includes a first substrate layer, a first coating layer and a second coating layer; the first coating layer and the second coating layer are respectively provided on two opposite surfaces of the first substrate layer. The second separator includes a second substrate layer, a third coating layer and a fourth coating layer; the third coating layer and the fourth coating layer are respectively provided on two opposite surfaces of the second substrate layer. The negative electrode plate is provided between the first separator and the second separator, the first active material layer is bonded to the second coating layer, and the second active material layer is bonded to the fourth coating layer. A bonding force between the first active material layer and the second coating layer is less than a bonding force between the second active material layer and the fourth coating layer. Relationship between the bonding force between the first active material layer and the second coating layer and the bonding force between the second active material layer and the fourth coating layer is regulated to make the bonding force between a negative electrode plate long side prone to lithium precipitation and the first separator less than the bonding force between a negative electrode plate short side and the second separator. In this way, compressive stresses at corners of the electrochemical apparatus are alleviated and interfacial gap at the corners are increased, which facilitates infiltration of more electrolyte at the corners and reduces a risk of forming a fracturing bridge phenomenon of the electrolyte at the corners of the electrochemical apparatus. Therefore, the risk of a fracturing bridge phenomenon of the electrolyte at a late stage of cycling of the electrochemical apparatus due to continuous consumption of electrolyte at the corner interface of the electrochemical apparatus is reduced, thereby reducing lithium precipitation at the corners caused by the fracturing bridge phenomenon of the electrolyte. In other words, possibility of growth of lithium dendrites at the corners is reduced, and the corner interface of the electrochemical apparatus is improved, so that safety performance and cycling performance of the electrochemical apparatus are enhanced.

In some embodiments of this application, a bonding force between the first active material layer and the second coating layer is 1 N/m to 5 N/m, and a bonding force between the second active material layer and the fourth coating layer is 6 N/m to 14 N/m. Therefore, the electrolyte at the corners of the electrochemical apparatus is improved, lithium precipitation at the corners of the electrochemical apparatus is alleviated, and growth of lithium dendrites is reduced, thereby enhancing safety performance and cycling performance of the electrochemical apparatus.

In some embodiments of this application, a bonding force between the first active material layer and the second coating layer is 6 N/m to 8 N/m, and a bonding force between the second active material layer and the fourth coating layer is 8 N/m to 12 N/m. Therefore, the electrolyte at the corners of the electrochemical apparatus is improved, lithium precipitation at the corners of the electrochemical apparatus is alleviated, and growth of lithium dendrites is reduced, thereby enhancing safety performance and cycling performance of the electrochemical apparatus. In some other embodiments of this application, a bonding force between the first active material layer and the second coating layer is 6 N/m to 8 N/m, and a bonding force between the second active material layer and the fourth coating layer is 8 N/m to 10 N/m.

In some embodiments of this application, the second coating layer and the fourth coating layer each independently include a first binder, and the first binder is independently selected from at least one of polyacrylic acid (PAA), polyvinylidene fluoride (PVDF), styrene-butadiene rubber, or carboxymethyl cellulose. Selection of the first binder above is more conducive to alleviating lithium precipitation at the corners of the electrochemical apparatus and reducing growth of lithium dendrites, thereby enhancing safety performance and cycling performance of the electrochemical apparatus.

In some embodiments of this application, a type of the first binder of the second coating layer is different from a type of the first binder of the fourth coating layer, and a thickness of the second coating layer is greater than a thickness of the fourth coating layer. Therefore, the type of the first binder of the second coating layer is selected based on a range of bonding force between the second coating layer and the first active material layer, and the type of the first binder of the fourth coating layer is selected based on a range of bonding force between the fourth coating layer and the second active material layer. When the type of the first binder of the second coating layer is different from the type of the first binder of the fourth coating layer, the thickness of the second coating layer is greater than the thickness of the fourth coating layer. This is more conducive to enhancing the safety performance and cycling performance of the electrochemical apparatus.

In some embodiments of this application, the thickness of the second coating layer is 1.5 μm to 3 μm, and the thickness of the fourth coating layer is 0.5 μm to 1.5 μm. The thickness of the second coating layer and the thickness of the fourth coating layer being regulated within the above ranges is more conducive to increasing interfacial gap at the corners of the electrochemical apparatus and thus more conducive to transmission of the electrolyte, thereby enhancing cycling performance of the electrochemical device.

In some embodiments of this application, a type of the first binder of the second coating layer is the same as a type of the first binder of the fourth coating layer, and a weight percentage of the first binder in the second coating layer is less than a weight percentage of the first binder in the fourth coating layer. In this way, a bonding force between the second coating layer and the first active material layer is less than a bonding force between the fourth coating layer and the second active material layer, which alleviates lithium precipitation at the corners of the electrochemical apparatus, and reduces growth of lithium dendrites, thereby enhancing safety performance and cycling performance of the electrochemical apparatus.

In some embodiments of this application, a weight percentage of the first binder in the second coating layer is 30% to 65%, and a weight percentage of the first binder in the fourth coating layer is 30% to 70%. This alleviates lithium precipitation at the corners of the electrochemical apparatus, and reduces growth of lithium dendrites, thereby enhancing safety performance and cycling performance of the electrochemical apparatus.

In some embodiments of this application, the first coating layer includes a first bonding layer and a first inorganic material layer provided between the first bonding layer and the first substrate layer; the third coating layer includes a third bonding layer and a second inorganic material layer provided between the third bonding layer and the second substrate layer; and the first inorganic material layer and the second inorganic material layer each independently include an inorganic material and an auxiliary additive; the inorganic material includes at least one of alumina, flaky boehmite, or spherical boehmite; the auxiliary additive includes at least one of microcrystalline wax, polyethylene wax, polypropylene wax, or carboxymethyl cellulose. Provision of the first inorganic material layer and the second inorganic material layer can reduce a risk of short circuit in the electrochemical apparatus due to the first separator and/or the second separator being pierced by burrs generated in the positive electrode plate, which is more conducive to enhancing safety performance of the electrochemical apparatus. Selection of the above inorganic material and auxiliary additive can further enhance safety performance of the electrochemical apparatus.

A second aspect of this application provides an electronic apparatus, including the electrochemical apparatus according to the first aspect of this application. Therefore, the electronic apparatus of this application has good cycling performance and safety performance.

This application has the following beneficial effects:

In an embodiment of this application, relationship between the bonding force between the first active material layer and the second coating layer and the bonding force between the second active material layer and the fourth coating layer is regulated to make the bonding force between the first active material layer and the second coating layer lower, thereby reducing a bonding force between a negative electrode plate long side prone to lithium precipitation and the first separator. In this way, compressive stresses at corners of the electrochemical apparatus are alleviated and interfacial gap at the corners are increased, which facilitates infiltration of more electrolyte at the corners and reduces a risk of forming a fracturing bridge phenomenon of the electrolyte at the corners of the electrochemical apparatus. Therefore, the risk of a fracturing bridge phenomenon of the electrolyte at a late stage of cycling of the electrochemical apparatus due to continuous consumption of electrolyte at the corner interface of the electrochemical apparatus is reduced, thereby reducing lithium precipitation at the corners caused by the fracturing bridge phenomenon of the electrolyte. In other words, possibility of growth of lithium dendrites at the corners is reduced, and the corner interface of the electrochemical apparatus is improved, so that safety performance and cycling performance of the electrochemical apparatus are enhanced.

BRIEF DESCRIPTION OF DRAWINGS

To describe the technical solutions in some embodiments of this application more clearly, the following briefly describes the accompanying drawings required for describing the embodiments. Apparently, the accompanying drawings in the following descriptions show some embodiments of this application, and a person of ordinary skill in the art may still derive others drawings from these accompanying drawings.

Reference signs in description of embodiments are described as follows:

11. first separator, 110. first substrate layer, 111. first coating layer, 112. second coating layer, 1111. first bonding layer, 1112. first inorganic material layer;

12. second separator, 120. second substrate layer, 123. third coating layer, 124. fourth coating layer, 1231. third bonding layer, 1232. second inorganic material layer;

21. negative electrode plate, 21a. negative electrode plate short side, 21b. negative electrode plate long side, 210.

negative electrode current collector, 211. first active material layer, 212. second active material layer; and 22. positive electrode plate.

DETAILED DESCRIPTION

To make the objectives, technical solutions, and advantages of this application more comprehensible, the following describes this application in detail with reference to accompanying drawings and embodiments. Apparently, the described embodiments are merely some rather than all embodiments of this application. All other technical solutions obtained by a person of ordinary skill in the art based on the embodiments of this application fall within the protection scope of this application.

It should be noted that in some embodiment of this application, a lithium-ion battery is used as an example of an electrochemical apparatus to illustrate this application. However, the electrochemical apparatus of this application is not limited to the lithium-ion battery.

Figure 1:
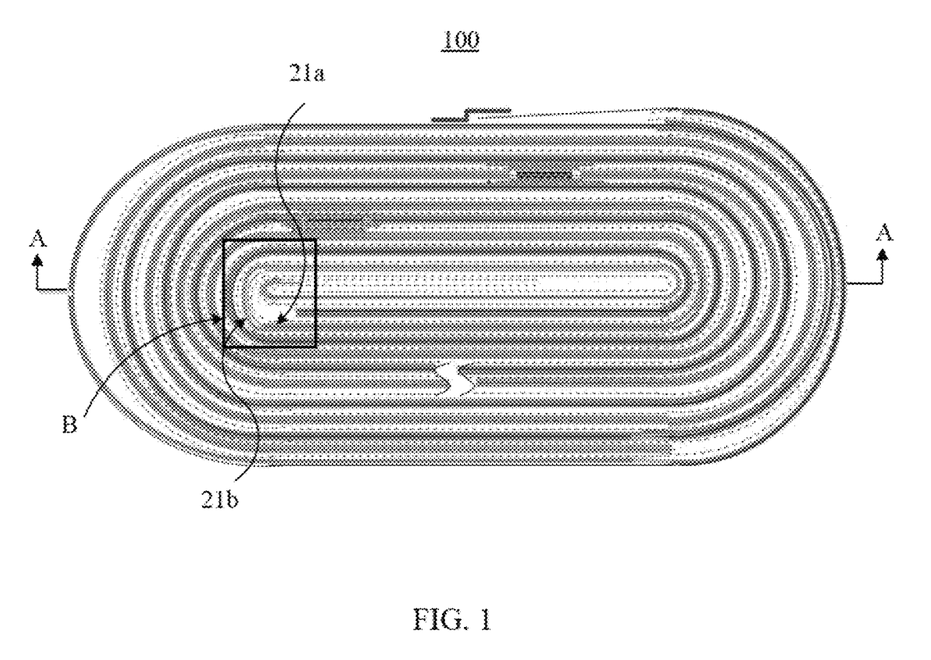
FIG. 1 is a schematic structural diagram of an electrochemical apparatus according to some embodiments of this application.
Figure 2:
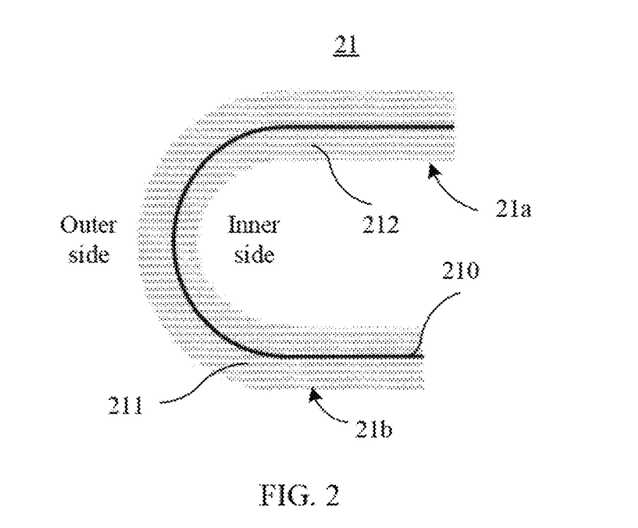
FIG. 2 is an enlarged view of area B in the electrochemical apparatus in FIG. 1.
Figure 3:
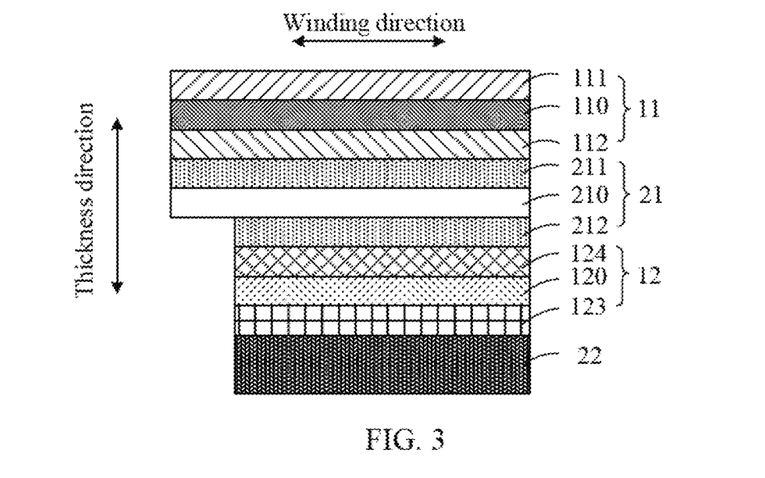
FIG. 3 is a schematic diagram showing a partial cross-sectional structure of the electrochemical apparatus along direction A-A in FIG. 1.

A first aspect of this application provides an electrochemical apparatus 100. As shown in FIG. 1 to FIG. 3, FIG. 2 being an enlarged view of area B in the electrochemical apparatus in FIG. 1 and FIG. 3 being a schematic diagram showing a partial cross-sectional structure of the electrochemical apparatus along direction A-A in FIG. 1, the electrochemical apparatus 100 is formed by stacking and then winding a first separator 11, a negative electrode plate 21, a second separator 12, and a positive electrode plate 22. The negative electrode plate 21 includes a negative electrode current collector 210, a first active material layer 211 and a second active material layer 212; the first active material layer 211 and the second active material layer 212 are respectively provided on two opposite surfaces of the negative electrode current collector 210, and in a winding direction of the electrochemical apparatus, a length of the first active material layer 211 is greater than a length of the second active material layer 212. The first separator 11 includes a first substrate layer 110, a first coating layer 111 and a second coating layer 112; the first coating layer 111 and the second coating layer 112 are respectively provided on two opposite surfaces of the first substrate layer 110. The second separator 12 includes a second substrate layer 120, a third coating layer 123 and a fourth coating layer 124; the third coating layer 123 and the fourth coating layer 124 are respectively provided on two opposite surfaces of the second substrate layer 120. The negative electrode plate 21 is provided between the first separator 11 and the second separator 12, the first active material layer 211 is bonded to the second coating layer 112, and the second active material layer 212 is bonded to the fourth coating layer 124. A bonding force between the first active material layer 211 and the second coating layer 112 is less than a bonding force between the second active material layer 212 and the fourth coating layer 124. Relationship between the bonding force between the first active material layer 211 and the second coating layer 112 and the bonding force between the second active material layer 212 and the fourth coating layer 124 is regulated to make the bonding force between a negative electrode plate long side 21b prone to lithium precipitation and the first separator 11 less than the bonding force between a negative electrode plate short side 21a and the second separator 12. In this way, compressive stresses at corners of the electrochemical apparatus 100 are alleviated and interfacial gap at the corners is increased, which facilitates infiltration of more electrolyte at the corners and reduces a risk of forming a fracturing bridge phenomenon of the electrolyte at the corners of the electrochemical apparatus 100. Therefore, the risk of a fracturing bridge phenomenon of the electrolyte at a late stage of cycling of the electrochemical apparatus due to continuous consumption of electrolyte at the corner interface of the electrochemical apparatus 100 is reduced, thereby reducing lithium precipitation at the corners caused by the fracturing bridge phenomenon of the electrolyte. In other words, possibility of growth of lithium dendrites at the corners is reduced, and the corner interface of the electrochemical apparatus 100 is improved, so that safety performance and cycling performance of the electrochemical apparatus 100 are enhanced.

In this application, as shown in FIG. 2, the "negative electrode plate long side 21b" refers to an outer side, including the first active material layer 211, of a wound negative electrode plate 21; and the "negative electrode plate short side 21a" refers to an inner side, including the second active material layer 212, of a wound negative electrode plate 21. In this application, as shown in FIG. 3, the "two opposite surfaces of the negative electrode current collector 210" refers to two surfaces of the negative electrode current collector 210 in a thickness direction.

In some embodiments of this application, a bonding force $F_1$ between the first active material layer and the second coating layer is 1 N/m to 5 N/m, and a bonding force $F_2$ between the second active material layer and the fourth coating layer is 6 N/m to 14 N/m. The bonding force between the first active material layer and the second coating layer being regulated within the above range is more conducive to alleviating compressive stresses at the corners of the electrochemical apparatus and reducing a risk of forming a fracturing bridge phenomenon of the electrolyte at the corners of the electrochemical apparatus. Therefore, lithium precipitation at the corners of the electrochemical apparatus is alleviated, and growth of lithium dendrites is reduced, thereby enhancing safety performance and cycling performance of the electrochemical apparatus. The bonding force between the second active material layer and the fourth coating layer being regulated within the above range is more conducive to controlling mechanical strength of the electrochemical apparatus and reducing a risk of other adverse mechanical deformation problems generated during subsequent use of the electrochemical apparatus.

In some embodiments of this application, a bonding force between the first active material layer and the second coating layer is 6 N/m to 8 N/m, and a bonding force between the second active material layer and the fourth coating layer is 8 N/m to 12 N/m. The bonding force between the first active material layer and the second coating layer being regulated within the above range can also alleviate lithium precipitation at the corners of the electrochemical apparatus, improve the electrolyte, and reduce growth of lithium dendrites, thereby enhancing safety performance and cycling performance of the electrochemical apparatus. In some other embodiments of this application, a bonding force between the first active material layer and the second coating layer is 6 N/m to 8 N/m, and a bonding force between the second active material layer and the fourth coating layer is 8 N/m to 10 N/m.

In some embodiments of this application, the second coating layer and the fourth coating layer each independently include a first binder, and the first binder is independently selected from at least one of polyacrylic acid, polyvinylidene fluoride, styrene-butadiene rubber, or carboxymethyl cellulose. Selection of the first binder above is more conducive to alleviating lithium precipitation at the corners of the electrochemical apparatus and reducing growth of lithium dendrites, thereby enhancing safety performance and cycling performance of the electrochemical apparatus.

In some embodiments of this application, a type of the first binder of the second coating layer is different from a type of the first binder of the fourth coating layer, and a thickness of the second coating layer is greater than a thickness of the fourth coating layer. Therefore, the type of the first binder of the second coating layer is selected based on a range of bonding force between the second coating layer and the first active material layer, and the type of the first binder of the fourth coating layer is selected based on a range of bonding force between the fourth coating layer and the second active material layer. When the type of the first binder of the second coating layer is different from the type of the first binder of the fourth coating layer, the thickness of the second coating layer is greater than the thickness of the fourth coating layer. This is more conducive to enhancing the safety performance and cycling performance of the electrochemical apparatus. Preferably, a type of the first binder of the second coating layer is polyvinylidene fluoride; and a type of the first binder of the fourth coating layer is polyacrylic acid.

Further, a thickness $T_2$ of the second coating layer is 1.5 μm to 3 μm, and a thickness $T_4$ of the fourth coating layer is 0.5 μm to 1.5 μm. The thickness of the second coating layer and the thickness of the fourth coating layer being regulated within the above ranges is more conducive to increasing interfacial gap at the corners of the electrochemical apparatus and thus more conducive to transmission of the electrolyte, thereby enhancing cycling performance of the electrochemical device.

In the foregoing embodiments, the weight percentage of the first binder in the second coating layer and the weight percentage of the first binder in the fourth coating layer are not particularly limited in this application, provided that the objectives of this application can be achieved. For example, a weight percentage $W_2$ of the first binder in the second coating layer is 30% to 65%, and a weight percentage $W_4$ of the first binder in the fourth coating layer is 30% to 70%.

Thicknesses of the first coating layer and the third coating layer are not particularly limited in this application, provided that the objectives of this application can be achieved. Preferably, thicknesses of the first coating layer and the second coating layer are 6 μm to 10 μm, and thicknesses of the third coating layer and the fourth coating layer are 3 μm to 7 μm.

In some embodiments of this application, a type of the first binder of the second coating layer is the same as a type of the first binder of the fourth coating layer, and a weight percentage of the first binder in the second coating layer is less than a weight percentage of the first binder in the fourth coating layer. The "weight percentage of the first bonding layer in the second coating layer" can also be understood as a "weight percentage of the first binder based on a total weight of the second coating layer". It should be noted that in this application, expressions similar to the "weight percentage of the first bonding layer in the second coating layer" can all be understood as a "weight percentage of the first binder based on a total weight of the second coating layer". In this way, when a type of the first binder of the second coating layer is the same as a type of the first binder of the fourth coating layer, a difference between the weight percentage of the first binder in the second coating layer and the weight percentage of the first binder in the fourth coating layer is regulated, to make the bonding force between the second coating layer and the first active material layer less than the bonding force between the fourth coating layer and the second active material layer, such that lithium precipitation at the corners of the electrochemical apparatus is alleviated, and growth of lithium dendrites is reduced, thereby enhancing safety performance and cycling performance of the electrochemical apparatus.

Further, the weight percentage $W_2$ of the first binder in the second coating layer is 30% to 65%, and the weight percentage $W_4$ of the first binder in the fourth coating layer is 30% to 70%. The weight percentage of the first binder in the second coating layer and the weight percentage of the first binder in the fourth coating layer being regulated within the above ranges is more conducive to regulating the bonding force between the second coating layer and the first active material layer and the bonding force between the fourth coating layer and the second active material layer within the scope of this application. In this way, a bonding force between the negative electrode plate long side prone to lithium precipitation and the first separator is less than the bonding force between the negative electrode short side and the second separator, alleviating lithium precipitation at the corners of the electrochemical apparatus and reducing growth of lithium dendrites, thereby enhancing safety performance and cycling performance of the electrochemical apparatus.

Types of the second binder of the first coating layer and the second binder of the third coating layer are not particularly limited in this application, provided that the objectives of this application can be achieved. For example, the second binder of the first coating layer and the second binder of the third coating layer are each independently selected from at least one of polyacrylic acid, polyvinylidene fluoride, styrene butadiene rubber, or carboxymethyl cellulose.

In some embodiments of this application, a type of the second binder of the first coating layer is the same as a type of the first binder of the second coating layer, and a type of the second binder of the third coating layer is the same as a type of the first binder of the fourth coating layer.

The weight percentage $W_1$ of the second binder in the first coating layer and the weight percentage $W_3$ of the second binder in the third coating layer are not particularly limited in this application, provided that the objectives of this application can be achieved. For example, a weight percentage $W_1$ of the first binder in the first coating layer is 30% to 65%, and a weight percentage $W_3$ of the second binder in the third coating layer is 30% to 70%.

Figure 4:
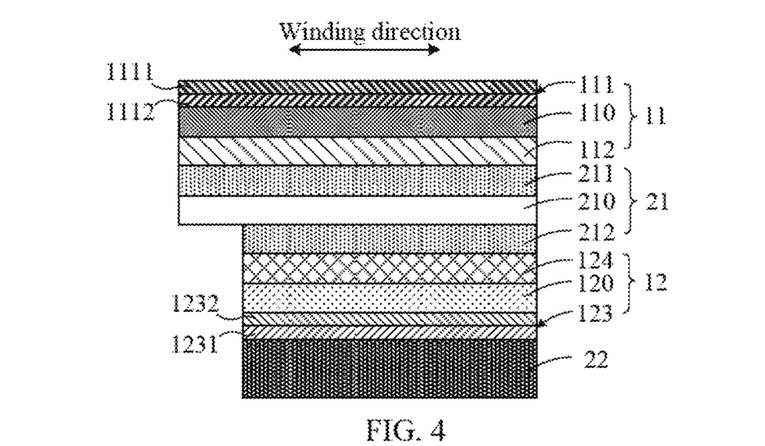
FIG. 4 is a schematic diagram showing a partial cross-sectional structure of an electrochemical apparatus according to some other embodiments of this application.

In some embodiments of this application, as shown in FIG. 4, the first coating layer 111 includes a first bonding layer 1111 and a first inorganic material layer 1112 provided between the first bonding layer 1111 and the first substrate layer 110; and the third coating layer 123 includes a third bonding layer 1231 and a second inorganic material layer 1232 provided between the third bonding layer 1231 and the second substrate layer 120. The first inorganic material layer 1112 and the second inorganic material layer 1232 each independently include an inorganic material and an auxiliary additive; the inorganic material includes at least one of alumina, flaky boehmite, or spherical boehmite; the auxiliary additive includes at least one of microcrystalline wax, polyethylene wax, polypropylene wax, or carboxymethyl cellulose. Provision of the first inorganic material layer 1112 and the second inorganic material layer 1232 can reduce a risk of short circuit in the electrochemical apparatus due to the first separator 11 and/or the second separator 12 being pierced by burrs generated in the positive electrode plate 22, which is more conducive to enhancing safety performance of the electrochemical apparatus. Selection of the above inorganic material and auxiliary additive can further enhance safety performance of the electrochemical apparatus.

Material types of the first substrate layer and the second substrate layer are not particularly limited in this application, provided that the objectives of this application can be achieved. For example, a material of the first substrate layer and a material of the second substrate layer are each independently selected from at least one of polyethylene, polypropylene, aramid, polyethylene terephthalate, teflon, polyacrylonitrile, polyimide, polyamide, polyester, or natural fibers.

Porosities of the first substrate layer and the second substrate layer are not particularly limited in this application, provided that the objectives of this application can be achieved. For example, the porosity is 30% to 45%. Porosities of the first substrate layer and the second substrate layer being within the above range can improve air permeability of the first separator and the second separator, thereby improving ion transmission performance.

Preparation methods of the first separator and the second separator are not particularly limited, provided that the objectives of this application can be achieved.

The negative electrode current collector is not particularly limited in this application, provided that the objectives of this application can be achieved. For example, the negative electrode current collector may include copper foil, copper alloy foil, nickel foil, stainless steel foil, titanium foil, foamed nickel, foamed copper, a composite current collector, or the like. In this application, the first active material layer and the second active material layer each independently include a negative electrode active material. A type of the negative electrode active material is not particularly limited in this application, provided that the objectives of this application can be achieved. For example, the negative electrode active material may include at least one of natural graphite, artificial graphite, a mesocarbon microbead (MCMB), hard carbon, soft carbon, silicon, a silicon-carbon composite, $SiO_x$ (0<x<2), a Li—Sn alloy, a Li—Sn—O alloy, Sn, SnO, $SnO_2$, spinel-structure lithium titanate $Li_4Ti_5O_{12}$, a Li—Al alloy, or lithium metal. In this application, thicknesses of the negative electrode current collector, the first active material layer, and the second active material layer are not particularly limited, provided that the objectives of this application can be achieved. For example, a thickness of the negative electrode current collector is 6 μm to 10 μm, and thicknesses of the first active material layer and the second active material layer are each independently 30 μm to 130 μm. In some embodiments, the negative electrode plate may include a conductive layer, where the conductive layer is located between the negative electrode current collector and the first active material layer, and/or the conductive layer is located between the negative electrode current collector and the second active material layer. Composition of the conductive layer is not particularly limited, and the conductive layer may be a conductive layer commonly used in the art. The conductive layer includes a conductive agent and a binder.

The positive electrode plate in this application is not particularly limited, provided that the objectives of this application can be achieved. For example, the positive electrode plate includes a positive electrode current collector and a positive electrode active material layer. The positive electrode current collector is not particularly limited in this application, provided that the objectives of this application can be achieved. For example, the positive electrode current collector may include aluminum foil, aluminum alloy foil, a composite current collector, or the like. The positive electrode active material layer in this application includes a positive electrode active material. A type of the positive electrode active material is not particularly limited in this application, provided that the objectives of this application can be achieved. For example, the positive electrode active material layer may include at least one of lithium nickel cobalt manganese oxide (NCM811, NCM622, NCM523, NCM111), lithium nickel cobalt aluminum oxide, lithium iron phosphate, lithium-rich manganese-based materials, lithium cobalt oxide ($LiCoO_2$), lithium manganese oxide, lithium iron manganese phosphate, or lithium titanium oxide. In this application, the positive electrode active material may further include a non-metal element, for example, the non-metal element includes at least one of fluorine, phosphorus, boron, chlorine, silicon, or sulfur. These elements can further improve stability of the positive electrode active material. In this application, thicknesses of the positive electrode current collector and the positive electrode active material layer are not particularly limited, provided that the objectives of this application can be achieved. For example, the thickness of the positive electrode current collector is 5 μm to 20 μm, and preferably 6 μm to 18 μm. A thickness of a one-sided positive electrode active material layer is 30 μm to 120 μm. In this application, the negative electrode active material layer may be disposed on one surface of the positive electrode current collector in a thickness direction, or may be disposed on two opposite surfaces of the positive electrode current collector. Optionally, the positive electrode plate may further include a conductive layer. The conductive layer is sandwiched between the positive electrode current collector and the positive electrode active material layer. Composition of the conductive layer is not particularly limited, and the conductive layer may be a conductive layer commonly used in the art.

The electrochemical apparatus in this application is not particularly limited, and may include any apparatus in which electrochemical reactions take place. In some embodiments, the electrochemical apparatus may include but is not limited to a lithium metal secondary battery, a lithium-ion secondary battery (lithium-ion battery), a lithium polymer secondary battery, or a lithium-ion polymer secondary battery.

A second aspect of this application provides an electronic apparatus, including the electrochemical apparatus according to any one of the foregoing embodiments.

The electronic apparatus in this application is not particularly limited, and the electronic apparatus may be any known electronic apparatus in the prior art. In some embodiments, the electronic apparatus may include but is not limited to a notebook computer, a pen-input computer, a mobile computer, an electronic book player, a portable telephone, a portable fax machine, a portable copier, a portable printer, a stereo headset, a video recorder, a liquid crystal television, a portable cleaner, a portable CD player, a mini-disc, a transceiver, an electronic notepad, a calculator, a memory card, a portable recorder, a radio, a standby power source, a motor, an automobile, a motorcycle, a power-assisted bicycle, a bicycle, a lighting appliance, a toy, a game console, a clock, an electric tool, a flash lamp, a camera, a large household battery, and a lithium-ion capacitor.

EXAMPLES

The following describes some embodiments of this application more specifically through examples and comparative examples. Various tests and evaluations were performed in the following methods. In addition, unless otherwise specified, "part" and "%" are based on weight.

Test Method and Device

Bonding Force Test

A negative electrode plate and a separator were taken, and the separator and the negative electrode plate being bonded into one should be ensured. A relatively flat section of the negative electrode plate (15 mm wide, 60 mm long) was cut as an example with a pair of scissors. The sample was pasted on a steel plate (an adhesion length of not less than 40 mm) with double-sided tape; and a piece of cardboard of the same width was fixed to an end of the sample. A tensile machine was turned on, with a testing speed set to 50 mm/min and a tensile cut-off displacement set to 40 mm. An end of the steel plate was fixed to a lower end of the tensile machine. The cardboard was reversely pulled for 180° and fixed to an upper end of the tensile machine to form an included angle of 180° between the sample and the steel plate in space. A tensile curve and original data were saved after the test, and an average value of plateaus of the tensile curve was recorded. Tensile strengths Fi corresponding to tensile distances from 10 mm to 30 mm in the test curve were taken, an average value Fa of the tensile strengths Fi was taken, and based on a width of the sample, a bonding force F(N/m) was obtained by calculating using the formula F(N/m)=Fa/(15/1000). The separator includes the first separator and the second separator.

Cycling Performance Test

At 25° C., the lithium-ion battery was charged to a voltage of 4.3 V at a constant current of 1.1 C, then charged to a voltage of 4.45 V at a constant current of 0.6 C, and then charged to a current of 0.05 C at a constant voltage of 4.45 V; and then the lithium-ion battery was discharged to a voltage of 3 V at a constant current of 0.5 C, and a discharge capacity of the first cycle was recorded. Charge and discharge cycle in the above step was repeated for 500 times, and a discharge capacity of the 500th cycle was recorded.

Cycling performance was characterized by cycling capacity retention rate. Cycling capacity retention rate=(discharge capacity of the 500th cycle/discharge capacity of the 1st cycle)×100%.

Single-Folded Lithium Precipitation Test

At 25° C., the lithium-ion battery was charged to a voltage of 4.3 V at a constant current of 1.1 C, then charged to a voltage of 4.45 V at a constant current of 0.6 C, and then charged to a current of 0.05 C at a constant voltage of 4.45 V; and then the lithium-ion battery was discharged to a voltage of 3 V at a constant current of 0.5 C, and a discharge capacity of the first cycle was recorded. Charge and discharge cycle in the above step was repeated for 500 times, and finally the lithium-ion battery was disassembled after being fully charged at 0.5 C. A golden portion of the negative electrode was defined as a zone without lithium precipitation. Other black zones are zones with lithium precipitation. Area of golden zone without lithium precipitation+area of black zones with lithium precipitation=total area of negative electrode plate.

Figure 5:
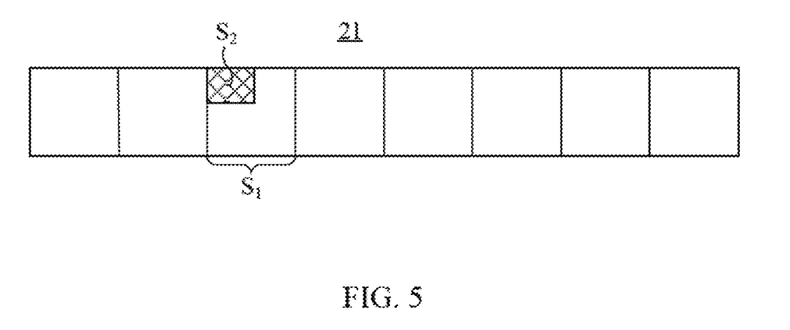
FIG. 5 is a schematic structural diagram of an unfolded negative electrode plate according to some embodiments of this application.

Percentage of single-folded lithium precipitation=average value of (area $S_2$ of lithium precipitation zones on single-folded negative electrode plate/area $S_1$ of single-folded negative electrode plate×100%), where the area $S_1$ of the single-folded negative electrode plate shown in FIG. 5 is an area of the negative electrode plate from each corner to another adjacent corner of the negative electrode plate.

Example 1

<Preparation of First Separator>

Flaky boehmite and carboxymethyl cellulose were mixed at a mass ratio of 40:3 and dissolved into deionized water to form a first inorganic material layer slurry with a solid content of flaky boehmite being 40 wt % and a solid content of carboxymethyl cellulose being 3 wt %. Then, the first inorganic material layer slurry was applied onto one surface of a substrate layer (polyethylene, a thickness of 5 μm, a porosity of 42%) through a micro-gravure coating method and dried to obtain a two-layer structure including a first inorganic material layer (a thickness of 4 μm) and a first substrate layer.

A first binder polyvinylidene fluoride was dissolved into deionized water to form a first bonding layer slurry with a solid content of 35 wt %. Then, the first bonding layer slurry was uniformly applied onto two opposite surfaces of the above two-layer structure respectively through the micro-gravure coating method to form two first bonding layers (thickness of 2 μm), and dried to obtain a first separator. The first bonding layer applied onto a surface of the first inorganic material layer and the first bonding layer jointly formed a first coating layer, where a weight percentage $W_2$ of the first binder in the first coating layer was 35%; and the first bonding layer applied onto a surface of the first substrate layer alone was a second coating layer, where a thickness $T_2$ of the second coating layer was 2.5 μm.

<Preparation of Second Separator>

Flaky boehmite and carboxymethyl cellulose were mixed at a mass ratio of 25:1 and dissolved in deionized water to form a second inorganic material layer slurry with a solid content of flaky boehmite being 50 wt % and a solid content of carboxymethyl cellulose being 2 wt %. Then, the second inorganic material layer slurry was applied onto one surface of a substrate layer (polyethylene, a thickness of 5 μm, a porosity of 42%) through the micro-gravure coating method and dried to obtain a two-layer structure including a second inorganic material layer (a thickness of 4 μm) and a second substrate layer.

A third binder polyacrylic acid was dissolved into deionized water to form a third bonding layer shiny with a solid content of 35 wt %. Then, the third bonding layer slurry was uniformly applied onto two opposite surfaces of the above two-layer structure respectively through the micro-gravure coating method to form two third bonding layers, and dried to obtain a second separator. The third bonding layer (a thickness of 1 μm) applied onto a surface of the second inorganic material layer and the third bonding layer jointly formed a third coating layer; and the third bonding layer applied onto a surface of the second substrate layer alone was a fourth coating layer, where a thickness $T_4$ of the fourth coating layer was 1 μm.

<Preparation of Positive Electrode Plate>

A positive electrode active material $LiCoO_2$, a conductive agent acetylene black, and a binder PVDF were mixed at a mass ratio of 97.5:0.8:1.7, added with N-methylpyrrolidone (NMP) as a solvent, and prepared into a slurry with a solid content of 75 wt %, and the slurry was stirred under an action of a vacuum mixer to obtain a uniform positive electrode slurry. The positive electrode slurry was uniformly applied onto a positive electrode current collector aluminum foil with a thickness of 10 μm and dried at 90° C. to obtain a positive electrode plate having a positive electrode active material layer coated on one surface, with a coating layer of 110 μm in thickness. Then, the foregoing steps were repeated on another surface of the positive electrode plate to obtain a positive electrode plate coated with positive electrode active materials on two surfaces. The positive electrode plate was dried at 90° C. and then cold pressed, followed by cutting and tab welding to obtain positive electrode plates of 74 mm×867 mm for later use.

<Preparation of Negative Electrode Plate>

A negative electrode active material graphite, a conductive agent Super P, and a binder styrene-butadiene rubber (SBR) were mixed at a mass ratio of 97.8:0.7:1.5, added with deionized water as a solvent, and prepared into a negative electrode slurry with a solid content of 70 wt %, and the negative electrode slurry was stirred under an action of a vacuum mixer to obtain a uniform negative electrode slurry. The negative electrode slurry was uniformly applied onto a surface of a negative electrode current collector copper foil with a thickness of 8 μm and dried at 90° C. to obtain a negative electrode plate having a negative electrode active material coated on one surface, with a first active material layer of 130 μm in thickness. Then, the foregoing steps were repeated on another surface of the negative electrode plate to obtain a negative electrode plate with negative electrode active materials coated on two surfaces and a second negative electrode active material layer of 130 μm in thickness. The negative electrode plate was dried at 90° C. and then cold pressed, followed by cutting and tab welding to obtain negative electrode plates of 76 mm×851 mm for later use.

in sequence and wound to obtain an electrode assembly. A second coating layer in the first separator was bonded to a first active material layer in the negative electrode plate, and a fourth coating layer in the second separator was bonded to a second active material layer in the negative electrode plate.

The electrode assembly was placed into an aluminum-plastic filmed housing and dried, and then the electrolyte was filled. After processes such as vacuum packaging, standing, formation, degassing, and trimming, a lithium-ion battery was obtained. An upper limit voltage for formation was 4.15 V, a formation temperature was 70° C., and a standing time in formation was 2 h.

Example 2 to Example 14

Example 2 to Example 14 were the same as Example 1 except that related preparation parameters were adjusted according to Table 1.

Comparative Examples 1 and 2

Example 2 to Example 14 were the same as Example 1 except that related preparation parameters were adjusted according to Table 1.

Preparation parameters and performance parameters of examples and comparative examples are shown in Table 1:

TABLE 1

| | First separator | | | | | Second separator | | | | | | | | |
|---|---|---|---|---|---|---|---|---|---|---|---|---|---|---|
| | Type of first binder of second coating layer | Type of second binder of first coating layer | $W_1$ (%) | $W_2$ (%) | $T_2$ (μm) | Type of first binder of fourth coating layer | Type of second binder of third coating layer | $W_3$ (%) | $W_4$ (%) | $T_4$ (μm) | $F_1$ (N/m) | $F_2$ (N/m) | Cycling performance (%) | Single-folded lithium precipitation percentage (%) |
| Example 1 | PVDF | PVDF | 35 | 35 | 2.5 | PAA | PAA | 35 | 35 | 1 | 1 | 8 | 93.6 | 0.14 |
| Example 2 | PVDF | PVDF | 35 | 35 | 2.5 | PAA | PAA | 55 | 55 | 1 | 1 | 12 | 92.3 | 0.11 |
| Example 3 | PVDF | PVDF | 55 | 55 | 2.5 | PAA | PAA | 40 | 40 | 1 | 3 | 9 | 93.9 | 0.08 |
| Example 4 | PVDF | PVDF | 55 | 55 | 2.5 | PAA | PAA | 50 | 50 | 1 | 3 | 11 | 94.1 | 0.07 |
| Example 5 | PVDF | PVDF | 65 | 65 | 2.5 | PAA | PAA | 35 | 35 | 1 | 4 | 8 | 92.5 | 0.09 |
| Example 6 | PVDF | PVDF | 65 | 65 | 2.5 | PAA | PAA | 55 | 55 | 1 | 4 | 12 | 92.2 | 0.11 |
| Example 7 | PVDF | PVDF | 65 | 65 | 2.5 | PAA | PVDF | 55 | 35 | 1 | 4 | 8 | 93.1 | 0.14 |
| Example 8 | PVDF | PVDF | 65 | 65 | 2.5 | PAA | PVDF | 55 | 55 | 1 | 4 | 12 | 92.7 | 0.15 |
| Example 9 | PAA | PVDF | 35 | 55 | 2.5 | PAA | PAA | 35 | 35 | 1 | 6 | 8 | 92.7 | 0.14 |
| Example 10 | PAA | PVDF | 35 | 66 | 2.5 | PAA | PAA | 35 | 55 | 1 | 8 | 10 | 91.8 | 0.12 |
| Example 11 | PVDF | PVDF | 35 | 35 | 2.5 | PVDF | PVDF | 50 | 50 | 1 | 4 | 2 | 93.1 | 0.12 |
| Example 12 | PAA | PAA | 30 | 30 | 1.5 | PAA | PAA | 55 | 55 | 1 | 12 | 8 | 85.3 | 4.13 |
| Example 13 | PVDF | PVDF | 35 | 35 | 1.5 | PAA | PAA | 35 | 35 | 0.5 | 1 | 8 | 93.5 | 0.08 |
| Example 14 | PVDF | PVDF | 65 | 65 | 3 | PAA | PAA | 55 | 55 | 1.5 | 4 | 12 | 93.2 | 0.07 |
| Comparative Example 1 | PAA | PAA | 45 | 45 | 1.2 | PAA | PAA | 45 | 45 | 1.2 | 10 | 10 | 63 | 18.56 |
| Comparative Example 2 | PAA | PVDF | 55 | 55 | 2.5 | PAA | PAA | 35 | 35 | 1 | 12 | 8 | 74.3 | 7.89 |

<Preparation of Electrolyte>

In an environment with a water content less than 10 ppm, non-aqueous organic solvents ethylene carbonate (EC), diethyl carbonate (DEC), propylene carbonate (PC), propyl propionate (PP), and vinylene carbonate (VC) were mixed at a mass ratio of 20:30:20:28:2, and then lithium hexafluorophosphate ($LiPF_6$) was added to the non-aqueous organic solvents, dissolved and well mixed to obtain an electrolyte, where a concentration of $LiPF_6$ was 1 mol/L.

<Preparation of Lithium-Ion Battery>

The prepared first separator, negative electrode plate, second separator, and positive electrode plate were stacked It can be known from the results in Table 1 that, when the bonding force $F_1$ between the first active material layer and the second coating layer is less than the bonding force $F_2$ between the second active material layer and the fourth coating layer, the lithium-ion batteries of Example 1 to Example 14 all have good cycling performance and safety performance.

It can be learned from Example 1 to Example 10 that, when different types of binders within the scope of this application are selected for the first separator and the second separator of the lithium-ion battery, and the weight percentage $W_2$ of the first binder of the second coating layer and the weight percentage $W_4$ of the first binder of the fourth coating layer are within the scope of this application, $F_1$ is less than $F_2$, and the lithium-ion batteries have good cycling performance and safety performance.

It can be learned from Example 11 and Example 12 that, when a same type of binder within the scope of this application is selected for the first separator and the second separator of the lithium-ion battery, the weight percentage $W_2$ of the first binder of the second coating layer and the weight percentage $W_4$ of the first binder of the fourth coating layer are within the scope of this application, and $W_2<W_4$, the lithium-ion batteries have good cycling performance and safety performance.

Generally, the thickness $T_2$ of the second coating layer and the thickness $T_4$ of the fourth coating layer also affect the cycling performance and safety performance. It can be learned from Example 1, Example 13, and Example 14 that the lithium-ion batteries with $T_2$ and $T_4$ being within the scope of this application have good cycling performance and safety performance.

In the lithium-ion batteries of Comparative Example 1 and Comparative Example 2, when the bonding force $F_1$ between the first active material layer and the second coating layer is not less than the bonding force $F_2$ between the second active material layer and the fourth coating layer, cycling performance and safety performance of the lithium-ion batteries have not been effectively enhanced.

The foregoing descriptions are merely preferred embodiments of this application, but are not intended to limit this application. Any modifications, equivalent replacements, and improvements made without departing from the spirit and principle of this application shall fall within the protection scope of this application.

What is claimed is:

1. An electrochemical apparatus, formed by stacking and then winding a first separator, a negative electrode plate, a second separator, and a positive electrode plate; wherein the negative electrode plate comprises a negative electrode current collector, a first active material layer and a second active material layer; the first active material layer and the second active material layer are respectively provided on two opposite surfaces of the negative electrode current collector; and in a winding direction of the electrochemical apparatus, a length of the first active material layer is greater than a length of the second active material layer; wherein,
the first separator comprises a first substrate layer, a first coating layer and a second coating layer; the first coating layer and the second coating layer are respectively provided on two opposite surfaces of the first substrate layer;
the second separator comprises a second substrate layer, a third coating layer and a fourth coating layer; the third coating layer and the fourth coating layer are respectively provided on two opposite surfaces of the second substrate layer;
the negative electrode plate is provided between the first separator and the second separator, the first active material layer is bonded to the second coating layer, and the second active material layer is bonded to the fourth coating layer; and
a bonding force between the first active material layer and the second coating layer is less than a bonding force between the second active material layer and the fourth coating layer.

2. The electrochemical apparatus according to claim 1, wherein the bonding force between the first active material layer and the second coating layer is 1 N/m to 5 N/m, and the bonding force between the second active material layer and the fourth coating layer is 6 N/m to 14 N/m.

3. The electrochemical apparatus according to claim 1, wherein the bonding force between the first active material layer and the second coating layer is 6 Wm to 8 N/m, and the bonding force between the second active material layer and the fourth coating layer is 8 N/m to 12 N/m.

4. The electrochemical apparatus according to claim 1, wherein the second coating layer and the fourth coating layer each independently comprise a first binder, and the first binder is independently selected from at least one of polyacrylic acid, polyvinylidene fluoride, styrene-butadiene rubber, or carboxymethyl cellulose.

5. The electrochemical apparatus according to claim 4, wherein a type of the first binder of the second coating layer is different from a type of the first binder of the fourth coating layer, and a thickness of the second coating layer is greater than a thickness of the fourth coating layer.

6. The electrochemical apparatus according to claim 5, wherein the thickness of the second coating layer is 1.5 μm to 3 μm and the thickness of the fourth coating layer is 0.5 μm to 1.5 μm.

7. The electrochemical apparatus according to claim 4, wherein a type of the first binder of the second coating layer is the same as a type of the first binder of the fourth coating layer, and a weight percentage of the first binder in the second coating layer is less than a weight percentage of the first binder in the fourth coating layer.

8. The electrochemical apparatus according to claim 7, wherein the weight percentage of the first binder in the second coating layer is 30% to 65%, and the weight percentage of the first binder in the fourth coating layer is 30% to 70%.

9. The electrochemical apparatus according to claim 1, wherein,
the first coating layer comprises a first bonding layer and a first inorganic material layer provided between the first bonding layer and the first substrate layer;
the third coating layer comprises a third bonding layer and a second inorganic material layer provided between the third bonding layer and the second substrate layer; and
the first inorganic material layer and the second inorganic material layer each independently comprise an inorganic material and an auxiliary additive; the inorganic material comprises at least one of alumina, flaky boehmite, or spherical boehmite; and the auxiliary additive comprises at least one of microcrystalline wax, polyethylene wax, polypropylene wax, or carboxymethyl cellulose.

10. The electrochemical apparatus according to claim 1, wherein a material of the first substrate layer and a material of the second substrate layer are each independently selected from at least one of polyethylene, polypropylene, aramid, polyethylene terephthalate, teflon, polyacrylonitrile, polyimide, polyamide, polyester, or natural fibers.

11. An electronic apparatus, comprising an electrochemical apparatus formed by stacking and then winding a first separator, a negative electrode plate, a second separator, and a positive electrode plate; wherein the negative electrode plate comprises a negative electrode current collector, a first active material layer and a second active material layer; the first active material layer and the second active material layer are respectively provided on two opposite surfaces of the negative electrode current collector, and in a winding direction of the electrochemical apparatus, a length of the first active material layer is greater than a length of the second active material layer; wherein, the first separator comprises a first substrate layer, a first coating layer and a second coating layer; the first coating layer and the second coating layer are respectively provided on two opposite surfaces of the first substrate layer;

the second separator comprises a second substrate layer, a third coating layer and a fourth coating layer; the third coating layer and the fourth coating layer are respectively provided on two opposite surfaces of the second substrate layer;

the negative electrode plate is provided between the first separator and the second separator, the first active material layer is bonded to the second coating layer, and the second active material layer is bonded to the fourth coating layer; and a bonding force between the first active material layer and the second coating layer is less than a bonding force between the second active material layer and the fourth coating layer.

12. The electronic apparatus according to claim 11, wherein the bonding force between the first active material layer and the second coating layer is 1 N/m to 5 N/m, and the bonding force between the second active material layer and the fourth coating layer is 6 N/m to 14 N/m.

13. The electronic apparatus according to claim 11, wherein the bonding force between the first active material layer and the second coating layer is 6 N/m to 8 N/m, and the bonding force between the second active material layer and the fourth coating layer is 8 N/m to 12 N/m.

14. The electronic apparatus according to claim 11, wherein the second coating layer and the fourth coating layer each independently comprise a first binder, and the first binder is independently selected from at least one of polyacrylic acid, polyvinylidene fluoride, styrene-butadiene rubber, or carboxymethyl cellulose.

15. The electronic apparatus according to claim 14, wherein a type of the first binder of the second coating layer is different from a type of the first binder of the fourth coating layer, and a thickness of the second coating layer is greater than a thickness of the fourth coating layer.

16. The electronic apparatus according to claim 15, wherein the thickness of the second coating layer is 1.5 μm to 3 μm, and the thickness of the fourth coating layer is 0.5 μm to 1.5 μm.

17. The electronic apparatus according to claim 14, wherein a type of the first binder of the second coating layer is the same as a type of the first binder of the fourth coating layer, and a weight percentage of the first binder in the second coating layer is less than a weight percentage of the first binder in the fourth coating layer.

18. The electronic apparatus according to claim 17, wherein the weight percentage of the first binder in the second coating layer is 30% to 65%, and the weight percentage of the first binder in the fourth coating layer is 30% to 70%.

19. The electronic apparatus according to claim 11, wherein,
the first coating layer comprises a first bonding layer and a first inorganic material layer provided between the first bonding layer and the first substrate layer;
the third coating layer comprises a third bonding layer and a second inorganic material layer provided between the third bonding layer and the second substrate layer; and
the first inorganic material layer and the second inorganic material layer each independently comprise an inorganic material and an auxiliary additive; the inorganic material comprises at least one of alumina, flaky boehmite, or spherical boehmite; and the auxiliary additive comprises at least one of microcrystalline wax, polyethylene wax, polypropylene wax, or carboxymethyl cellulose.

20. The electrochemical apparatus according to claim 11, wherein a material of the first substrate layer and a material of the second substrate layer are each independently selected from at least one of polyethylene, polypropylene, aramid, polyethylene terephthalate, teflon, polyacrylonitrile, polyimide, polyamide, polyester, or natural fibers.

* * * * *